(12) United States Patent
Silverman et al.

(10) Patent No.: US 7,647,346 B2
(45) Date of Patent: Jan. 12, 2010

(54) AUTOMATIC RULES-BASED DEVICE SYNCHRONIZATION

(75) Inventors: Andrew L. Silverman, Redmond, WA (US); Daniel Plastina, Sammamish, WA (US); Kipley J. Olson, Mercer Island, WA (US); Michael J. Novak, Redmond, WA (US); William D. Sproule, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 11/092,354

(22) Filed: Mar. 29, 2005

(65) Prior Publication Data
US 2006/0224620 A1 Oct. 5, 2006

(51) Int. Cl.
*G06F 17/30* (2006.01)
*G06F 15/16* (2006.01)

(52) U.S. Cl. .................................. 707/104.1; 707/205

(58) Field of Classification Search ................. 718/103, 718/104; 358/1.15, 1.14; 399/82; 707/104.1, 707/205
See application file for complete search history.

(56) References Cited

U.S. PATENT DOCUMENTS

| | | | |
|---|---|---|---|
| 5,706,509 A | 1/1998 | Tso | |
| 5,726,898 A * | 3/1998 | Jacobs | .................. 700/231 |
| 5,872,969 A | 2/1999 | Copeland et al. | |
| 5,950,198 A | 9/1999 | Falls et al. | |
| 6,052,735 A * | 4/2000 | Ulrich et al. | .................. 709/236 |
| 6,324,544 B1 * | 11/2001 | Alam et al. | .................. 707/201 |
| 6,553,391 B1 | 4/2003 | Goldring et al. | |
| 6,625,623 B1 | 9/2003 | Midgley et al. | |
| 6,952,475 B1 | 10/2005 | Horn et al. | |
| 7,039,580 B1 | 5/2006 | Brown et al. | |
| 7,243,075 B1 * | 7/2007 | Shaffer et al. | .................. 705/10 |
| 2002/0001395 A1 | 1/2002 | Davis et al. | |
| 2002/0026503 A1 | 2/2002 | Bendinelli et al. | |
| 2002/0033844 A1 | 3/2002 | Levy et al. | |
| 2002/0056040 A1 | 5/2002 | Simms | |
| 2002/0059370 A1 | 5/2002 | Shuster | |
| 2002/0069218 A1 | 6/2002 | Sull et al. | |
| 2002/0078075 A1 * | 6/2002 | Colson et al. | .................. 707/204 |
| 2002/0087797 A1 * | 7/2002 | Adrangi | .................. 711/133 |
| 2002/0099737 A1 | 7/2002 | Porter et al. | |
| 2002/0103920 A1 | 8/2002 | Berkun et al. | |
| 2002/0143976 A1 | 10/2002 | Barker et al. | |
| 2002/0157095 A1 | 10/2002 | Masumitsu et al. | |

(Continued)

OTHER PUBLICATIONS

MusicMatch, MusicMatch Jukebox Use's Guide, Feb. 7, 2003, Chapters A1-A6 and 1-9.

(Continued)

*Primary Examiner*—John E Breene
*Assistant Examiner*—Alex Gofman
(74) *Attorney, Agent, or Firm*—Senniger Powers LLP

(57) ABSTRACT

Automatic rules-based synchronization of digital files on a source device and a target device coupled to it. A source computer executes a synchronization engine for managing transfer of files from a source database to a target device coupled to the computer as a function of a defined storage capacity of the device. The synchronization engine is configured to receive user-defined rules for selecting which of the files are to be transferred to the device and assigning priorities to the files. The synchronization engine builds a designated list of the files to be transferred according to the priorities defined by the rules.

15 Claims, 13 Drawing Sheets

U.S. PATENT DOCUMENTS

| | | | |
|---|---|---|---|
| 2003/0016238 A1* | 1/2003 | Sullivan et al. | 345/705 |
| 2003/0079038 A1 | 4/2003 | Robbin et al. | |
| 2003/0204519 A1* | 10/2003 | Sirivara et al. | 707/101 |
| 2004/0003302 A1* | 1/2004 | Marshall et al. | 713/300 |
| 2004/0006575 A1 | 1/2004 | Visharam et al. | |
| 2004/0045027 A1* | 3/2004 | Takamura et al. | 725/78 |
| 2004/0172593 A1 | 9/2004 | Wong et al. | |
| 2004/0267693 A1 | 12/2004 | Lowe et al. | |
| 2005/0210279 A1 | 9/2005 | Lee et al. | |
| 2005/0234958 A1 | 10/2005 | Sipusic et al. | |
| 2005/0235015 A1 | 10/2005 | Abanami et al. | |

OTHER PUBLICATIONS

Edward Swierk, et al., The Roma Personal Metadata Service, Mobile Networks and Applications vol. 7, pp. 407-418, 2002.

Apple, *Sync music, podcasts and photos to go,* http://www.apple.com/itunes/sync.html, Jul. 20, 2005, 2 pp, Apple Computer, Inc., United States.

Blackberry, *Corporate Data Access,* http://www.blackberry.com/products/service/cda.shtml, Jul. 22, 2005, 2 pp, Research In Motion, Ltd.

Good Technology, Inc., GoodAccess™, http://www.good.com/index.php/products_good_access.html, Jul. 22, 2005, 2 pp., Good Technology, Inc., United States.

Good Technology, Inc., GoodLink™ Wireless Messaging, http://www.good.com/index.php/products_wireless_email.html, Jul. 22, 2005, 2 pp., Good Technology, Inc., United States.

Microsoft, *About Devices,* http://msdn.microsoft.com/library/default.asp?url=/library/en-us/wmplay10/mmp_sdk/aboutdevices.asp, Jul. 20, 2005, 1 pg., Microsoft Corporation, United States.

Microsoft, *About Partnerships,* http://msdn.microsoft.com/library/default.asp?url=/library/en-us/wmplay10/mmp_sdk/aboutpartnerships.asp, Jul. 20, 2005, 1 pg., Microsoft Corporation, United States.

Microsoft, *About the Synchronization Engine,* http://msdn.microsoft.com/library/default.asp?url=/library/en-us/wmplay10/mmp_sdk/aboutdevicesynchronization.asp, Jul. 20, 2005, 1 pg., Microsoft Corporation, United States.

Microsoft, *About Playlist Synchronization,* http://msdn.microsoft.com/library/default.asp?url=/library/en-us/wmplay10/mmp_sdk/aboutplaylistsynchronization.asp, Jul. 20, 2005, 2 pp., Microsoft Corporation, United States.

* cited by examiner

AUTOMATIC RULES-BASED DEVICE SYNCHRONIZATION

TECHNICAL FIELD

Embodiments of the present invention relate to the field of processing digital media content. In particular, embodiments of the invention relate to automatic rules-based synchronization of user-configurable device storage.

BACKGROUND OF THE INVENTION

As digital media technology improves and the price of storage decreases, users increasingly host collections of digital media on their personal computers. But users often desire for their digital media collections to be portable. More and more, users seek to transfer all or some of their collections to portable client devices. Digital media includes, for example, music, images, videos, and the like.

Users transfer media content from personal computers to a variety of other devices including other personal computers and portable consumer electronic media devices. Examples of portable devices include Personal Media Players (e.g., MP3 players), Personal Digital Assistants (PDAs), cell phones, notebook or laptop computers, and other portable client devices. Transferring at least part of a digital media collection to a portable device allows a user to enjoy media away from his or her main personal computer.

With the advent of relatively high capacity storage on portable client devices, users can store large numbers of media files on their devices. But filling such a device with a meaningful subset of a user's digital media collection can be a laborious task. This is especially true when the user's digital media collection is larger than the storage on the device (e.g., 100 GB digital media collection on the main computer and 5 GB storage on the client device).

Unfortunately, conventional digital media systems require users to manually manage this problem. If the collection of digital media on a user's source device (e.g., main personal computer) exceeds the storage capacity of the target device (e.g., portable client device), the user must manually select which items to include (and/or exclude) in a transfer from the source to the target. Furthermore, under conventional approaches, a user must remove items from an otherwise full memory of the target device when the user wishes to replace it with a new item from the collection on the source device.

The problem is compounded by the absence of an extensible solution that can be partnered with any number of devices and that can deal with potential device-side changes available with an open device model.

In light of the foregoing, improvements in processing digital media content are desired to permit automatically synchronizing content based on a set of rules (comprised of playlists, for example) and other features.

SUMMARY OF THE INVENTION

Embodiments of the invention overcome one or more deficiencies in the prior art by permitting automatic rules-based synchronization of user-configurable device storage. According to embodiments of the invention, prioritization with respect to a full device and device manipulation external to synchronization enhances the device synchronization experience. Aspects of the invention fully encompass the process of a priority rules-based synchronization system that can be partnered with any number of devices and deal with potential device-side changes available with an open device model.

A method embodying aspects of the invention synchronizes digital files stored on a source device and a target device coupled to it. The method comprises receiving a plurality of rules for selecting which of the digital files are to be transferred from the source device to the target device and building a designated list of the digital files to be transferred. In this instance, the rules assign priorities to the digital files and each of the digital files in the designated list are ordered according to the priorities defined by the rules. The designated list also omits duplicate digital files that have lower priorities than their duplicate digital files. The method further comprises transferring the digital files remaining on the designated list from the source device to the target device as a function of a defined storage capacity of the target device.

Yet another aspect of the invention involves a method of synchronizing one or more digital files stored on a source device and a target device coupled to it. The method comprises receiving a plurality of rules for selecting which of the digital files are to be transferred from the source device to the target device and building a designated list of the digital files to be transferred. In this instance, the rules assign priorities to the digital files and each of the digital files in the designated list are ordered according to the priorities defined by the rules. The method further comprises examining the target device to detect whether the digital files stored on the target device have changed since the last synchronization, building a content list of the digital files previously transferred, comparing the content list to the designated list, and transferring, from the source device to the target device, only the digital files on the designated list but not on the content list as a function of a defined storage capacity of the target device.

A media player system for synchronizing digital media files also embodies aspects of the invention. The media player system comprises a source database storing a plurality of digital media files and a computer associated with the database. The source computer comprises a synchronization engine for managing transfer of media files from the source database to a portable device coupled to the computer as a function of a defined storage capacity of the portable device. In one aspect, the synchronization engine is configured to receive user-defined playlists for selecting which of the media files are to be transferred to the portable device and assigning priorities to the digital files. The synchronization engine is further configured to build a designated list of the digital files to be transferred. The digital files in the designated list are ordered according to the priorities defined by the playlists and the designated list omits duplicate digital files that have lower priorities than their duplicate digital files.

Computer-readable media having computer-executable instructions for performing a method of managing synchronization embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

FIGS. 3A-3J illustrate the exemplary synchronization process of FIG. 2 in greater detail.

DETAILED DESCRIPTION OF THE INVENTION

Figure 1:
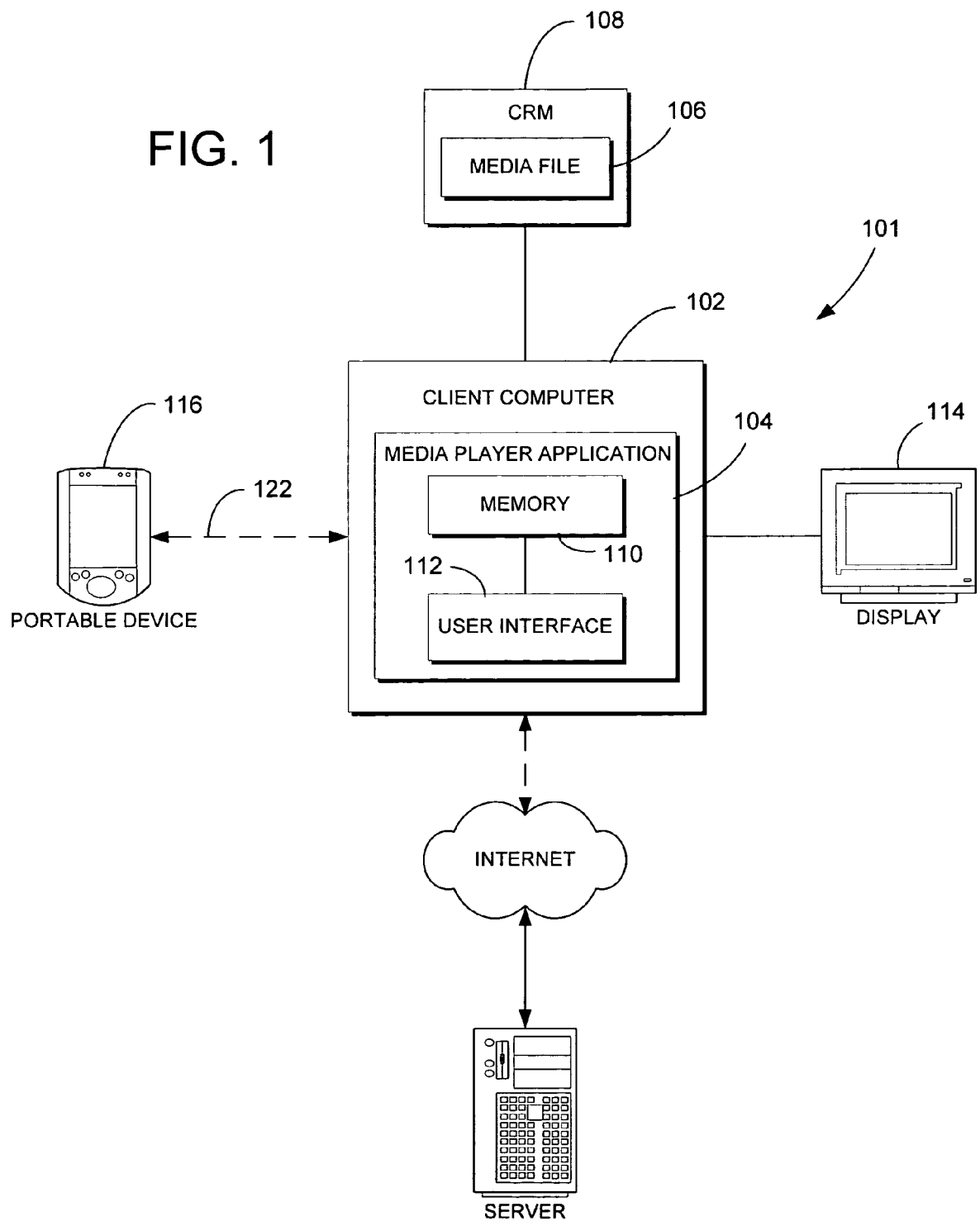
FIG. 1 is a block diagram of an exemplary computer system in which the present invention may be used.

Referring now to the drawings, FIG. 1 illustrates an exemplary computer system 101 in which the present invention can be used. Aspects of the invention involve prioritization with respect to a portable client device that is full and device manipulation external to synchronization. This is particularly important because content availability will likely grow faster than storage capacity on many of these devices (especially with video becoming more common). Advantageously, one or more embodiments of the invention provide an engine that fully encompasses the process of priority rules-based synchronization and that can be partnered with any number of devices and deal with potential device-side changes available with an open device model. Aspects of the invention not only automatically sync based on a set of rules (e.g., comprised of playlists) but goes above and beyond a direct synchronization in several notable ways described in detail below.

The system 101 includes a client computer 102 that executes a media player application (MPA) 104. The media player application 104 can be any suitable rendering filter or program that is configured to play digital media so that a user can experience the content embodied on the media. For example, a suitable MPA 104 includes a CD media player application, a digitally-compressed-file player application, and/or a DVD media player application. Executing MPA 104 in the illustrated embodiment, allows the user to access a digital media file 106 on a computer-readable medium (CRM) 108 such as a compact disc, hard drive, network server, or other suitable computer storage media. The MPA 104 also accesses, retrieves, stores, and displays metadata associated with the media file for the user. Those skilled in the art are familiar with metadata, which is simply information about data. In the context of the present invention, metadata involves information related to specific content of digital media file 106 being played via MPA 104. Basic metadata includes, for example, one or more of album title, artist, performer, genre, description of content, and the like. Extended or premium metadata includes album art, performer biographies, reviews, related performers, where to buy similar items, upcoming concerts, ticket sales, uniform resource locators for other related experiences including purchase opportunities, and the like. The MPA 104 accesses a memory 110 for storing digital media files 106, and includes a graphical user interface 112 for displaying media files 106 and/or organized metadata to the user on a display 114. The UI 112 may also be used to assist the user in transferring media files 106 and organized metadata to a remote device such as a portable media device 116 communicatively connected to the computer 102.

According to embodiments of the invention, an exemplary portable media device 116 may be a media transfer protocol (MTP) device, a personal digital assistant (PDA), a smartphone device or cellular telephone, a mass storage device, a Moving Picture Experts Group audio layer-3 (MP3) player, an audio system in an automobile, a notebook, laptop, or tablet PC, or the like. Although the present invention is particularly well suited for transferring digital media files between a main device and a portable device, aspects of the invention may even be applied to transferring files between desktop personal computers. In general, such device 116 will have a suitable rendering filter or media player or device that is configured to render digital media so that the user can experience the content that is transferred to media device 116.

In the examples herein, the media content of digital media file 106 may be audio data, video data, still image data, and/or text data. Examples of digital items in a collection may also include static or automated playlists of files or any grouping of files or data. It is to be appreciated and understood that the media content can be embodied on any suitable media, including digital files downloaded to the client computer's memory, and that the specific examples described herein are given to further understanding of the inventive principles. For example, the media content can include, without limitation, specially encoded media content in the form of an encoded media file (e.g., media content encoded in Microsoft® Windows Media™ format using the Microsoft® Windows Media™ Player program by Microsoft Corporation of Redmond, Wash.).

FIG. 1 illustrates an exemplary source-target synchronization scenario. In the depicted scenario, computer 102 comprises a source device and portable device 116 comprises a target device. In the illustrated embodiment, computer 102 executes a target device storage sync manager program module, or synchronization engine, embodied on one or more processor-readable media (such as a computer storage or memory 110) and implemented as part of multimedia software product, an operating system, or a dedicated multimedia appliance.

The exemplary target device storage sync manager provides a user-configurable model for facilitating automatic transfer of all or a subset of a user's digital collection to the target, portable device 116, from the source, computer 102. In FIG. 1, a transfer interface 122 couples target device 116 to source computer 102. This physical interface may be wired or wireless. Examples of a wired interface include USB, IEEE 1394, IEEE1284 ("parallel" connection), RS-232 Serial connection, and/or Ethernet, Token Ring, and similar networks. Examples of a wireless interface include Bluetooth; Infra-Red (IR); 802.11a, b, or g; GPRS, CDMA, EVDO, EDGE, and other related wireless telephony data-transmission standards. In some implementations, the interface 122 may provide for data transfer over a short distance (e.g., measured in a few feet) or over a long distance (e.g., measured in miles).

Some items in the digital collection may be more important to the user than others. The exemplary target device storage sync manager explicitly, implicitly, and/or heuristically assigns digital items in the collection with a transfer priority to indicate their relative importance or desirability to the user. Referring further to the prioritization aspects of the present invention, in at least one embodiment, the digital items that matter most to the user are automatically transferred to the target device 116, the items that matter less may be used to dynamically fill the target device, and the items that user never wants on the device will not be transferred there.

From the highest to lowest user-designated priority, items are automatically transferred from the source device, computer 102, to the target device, portable client 116, via the interface 122. This transfer occurs until the collection is exhausted or the storage capacity of the target device is consumed. Assuming that the storage capacity of device 116 is less than that which would be consumed by the entire digital library, this action stores the most user-desirable digital items from the collection.

The transfer from computer 102 to device 116 (and vice versa) may be called "synchronization" (or simply "sync"). As the collection on the source device changes (e.g., items removed, items added, and/or item priority changes), the subset of the collection which is stored on the target device changes with each synchronization. Indeed, if storage space on device 116 is limited, items may be removed from the target device during synchronization and replaced with new items from the collection which have higher priority.

Typically, the synchronization process will remove the lowest priority items in bottom-up fashion until sufficient space is cleared to store higher priority items that have not yet been synced with the device.

Although the priority of the items is user-assignable, some embodiments may include pre-formed automatic settings (and/or heuristics) to anticipate a user's expected priority settings. For example, there may be a pre-formed setting to give a higher priority to all items new in the last week than to older items.

With respect to prioritization, consider when the storage capacity of device 116 becomes completely full as a result of synchronization with the source device, i.e., computer 102. In this example, a default set of sync rules (e.g., five-star content, most frequently played, etc) defines which of the media files are of the greatest importance to the user. In the alternative, the user may specify criteria for prioritization. Under conventional synchronization schemes, device 116 would simply declare that the content does not fit and would require either editing of playlists to make the content fit or removing some rules entirely to make the content fit. In contrast, synchronization according to aspects of the invention would sync new content that happens to be higher in the user's priority list and drop the lowest priority content off of device 116 automatically.

As described above, aspects of the present invention involve synchronization and transfer of data to portable media player device 116. In one embodiment, the invention relates to prioritization, and includes prioritization to properly maintain a full device; parallel transcoding and device transfer; transferring items ahead of the prioritized queue while waiting on a more lengthy non-transfer operation (e.g., transcoding) but still retaining proper prioritization; space reservation; and an exclusion list/rule. Another aspect of the invention involves operation of the device 116 in an open system, and includes dealing with files moved or deleted on device 116 outside of the player sync; recognizing and "taking over" a file located on device 116 that matches a transfer file; and synchronizing to a metadata organized hierarchy. According to yet another aspect, the invention provides maintenance of the device transfer, and includes synchronizing on-device metadata edits with the media library; recognizing and sending individual metadata updates without re-sending the content; synthesizing and pushing album objects to device 116; recovering from a disconnected sync and avoiding leaving stale data on device 116 (e.g., partial transfers or directory names); and tracking and re-use of transcoded files.

In one embodiment, the user selects which playlists he or she would like to have transferred to the device. Those skilled in the art are familiar with the use of playlists to define sets of media files meeting certain specified criteria. A playlist may be a fixed list of media files created by the user, a "smart" playlist that issues a query (such as "Rating=5 stars"), or the like. According to aspects of the invention, the user is also allowed to reorder this list to prioritize which rules are most important to the user. For example, the user may wish to place a "Rating=5 stars" playlist ahead of a "Genre=Pop" playlist. In other words, the user prioritizes the rating rule higher than the genre rule. When synchronization begins, either manually or by plugging in device 116, synchronization proceeds according to a sync algorithm embodying aspects of the invention.

Figure 2:
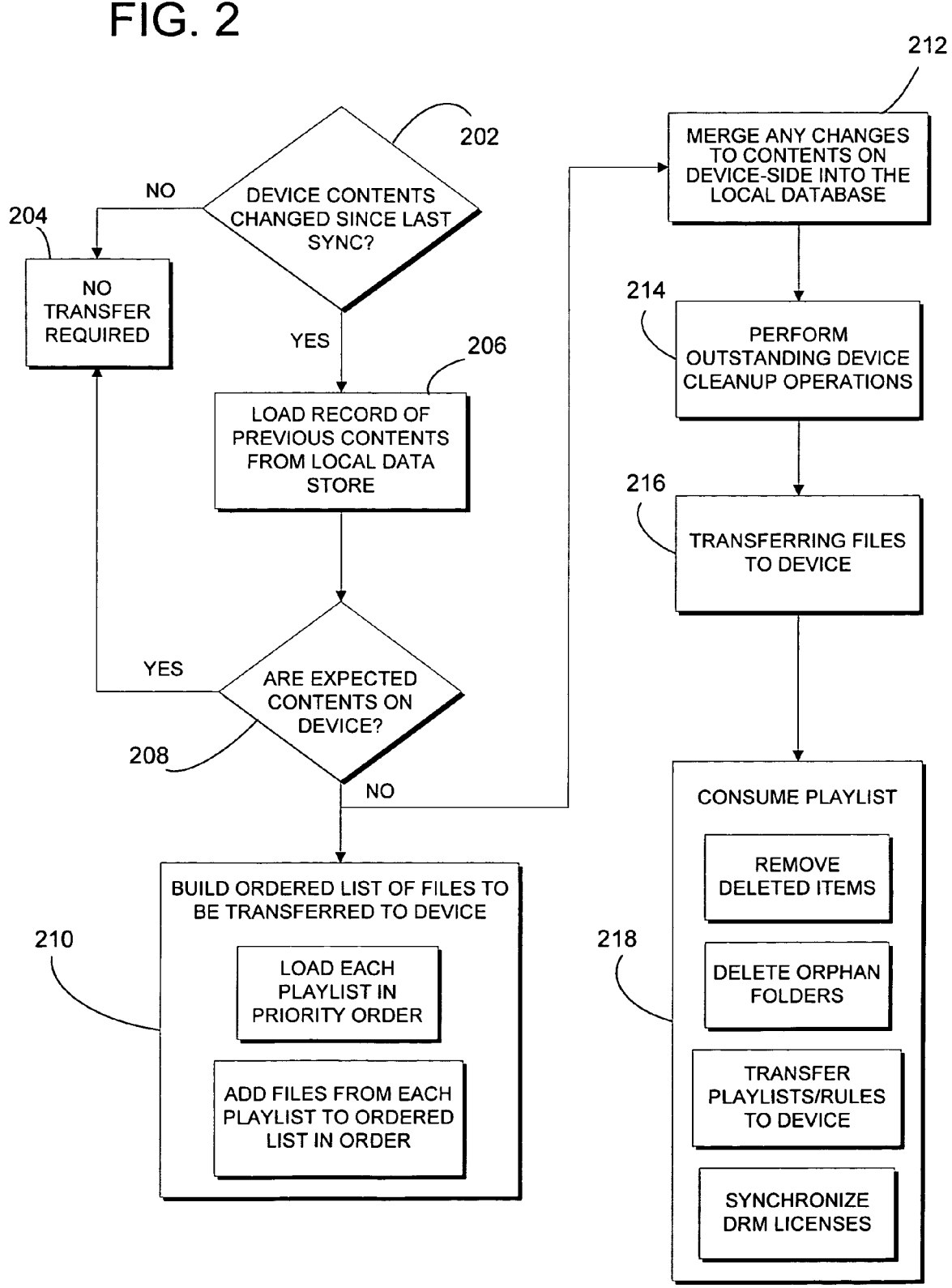
FIG. 2 is a flow diagram illustrating an exemplary synchronization process according to aspects of the present invention.
Figure 3A:
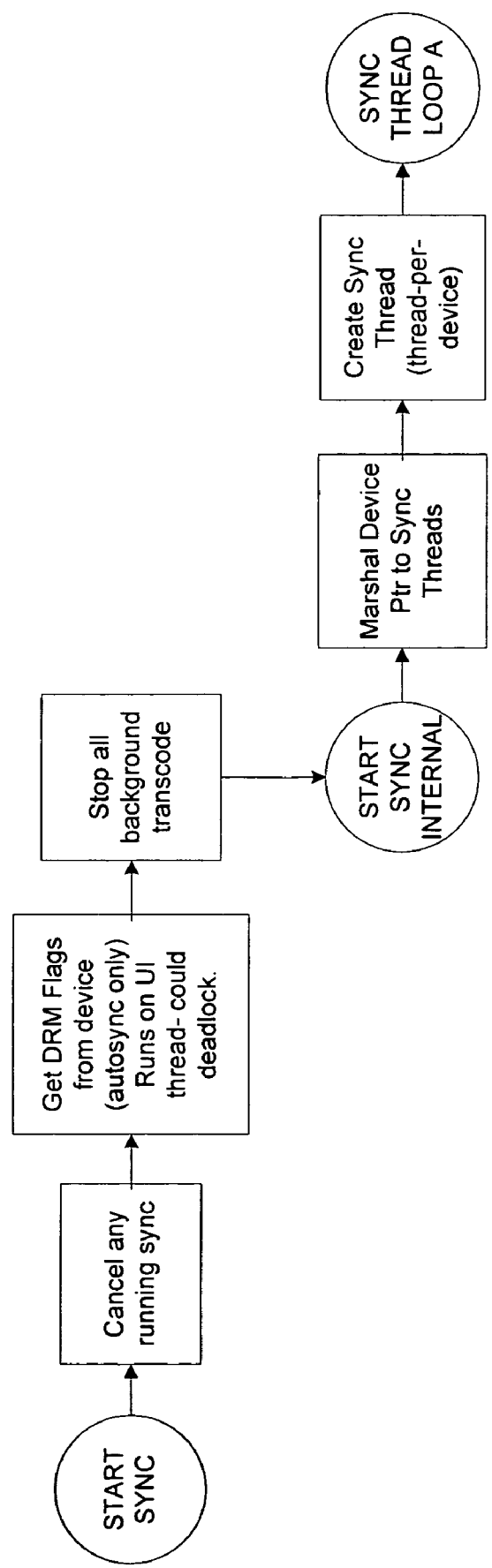
Figure 3B:
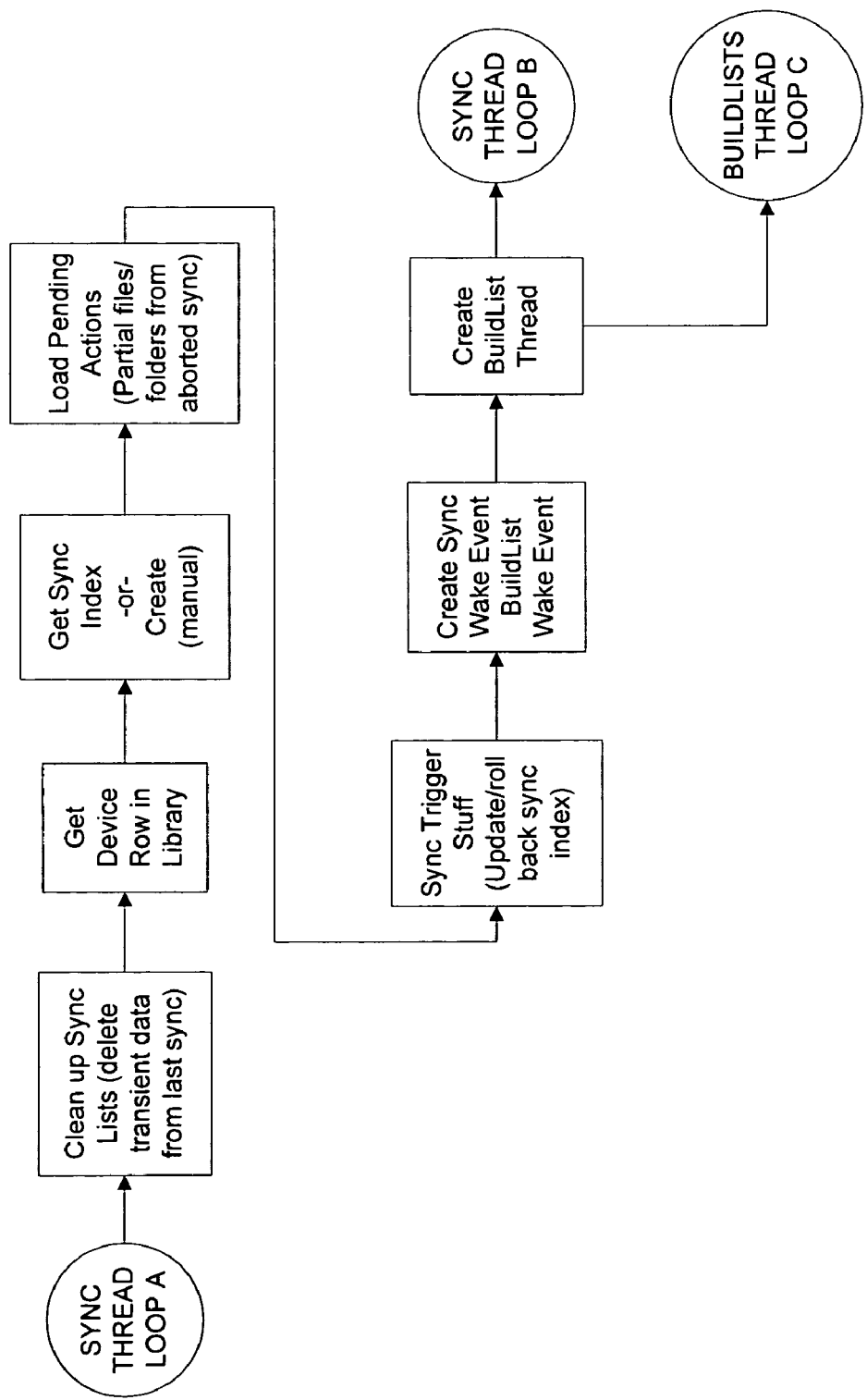
Figure 3C:
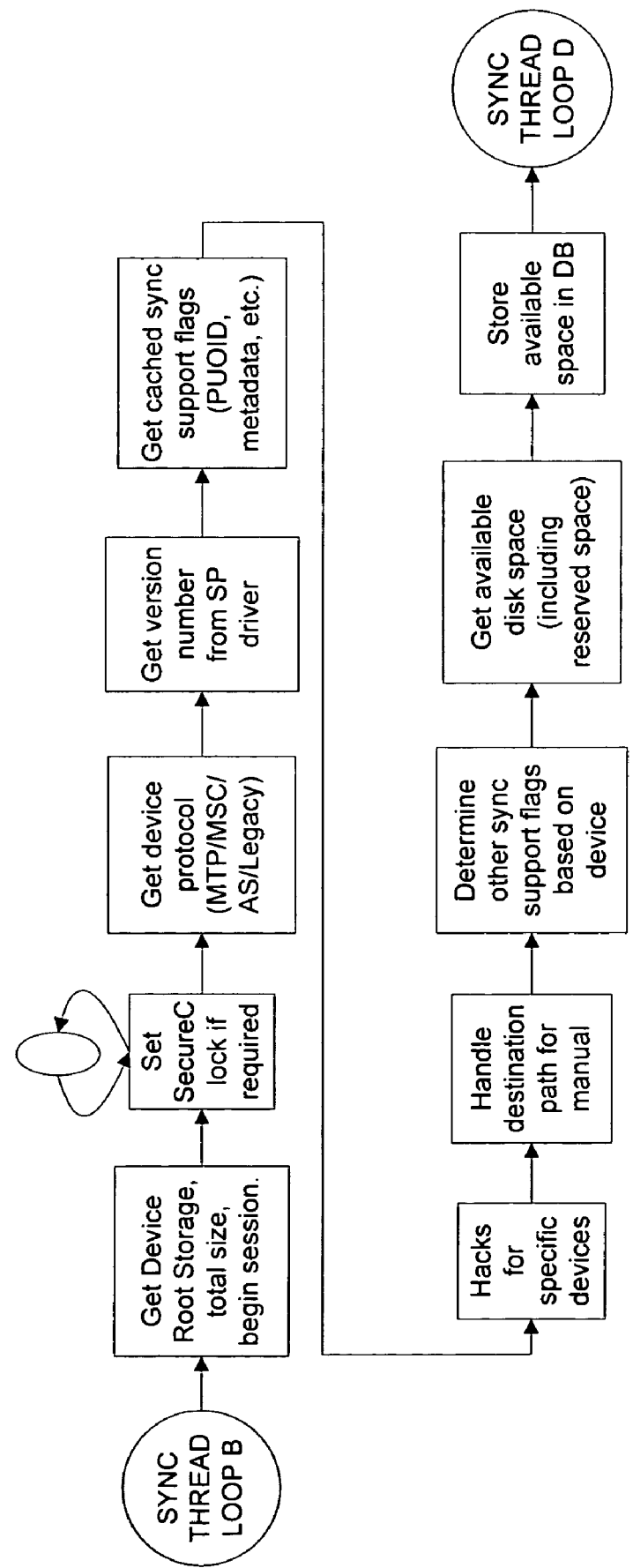
Figure 3D:
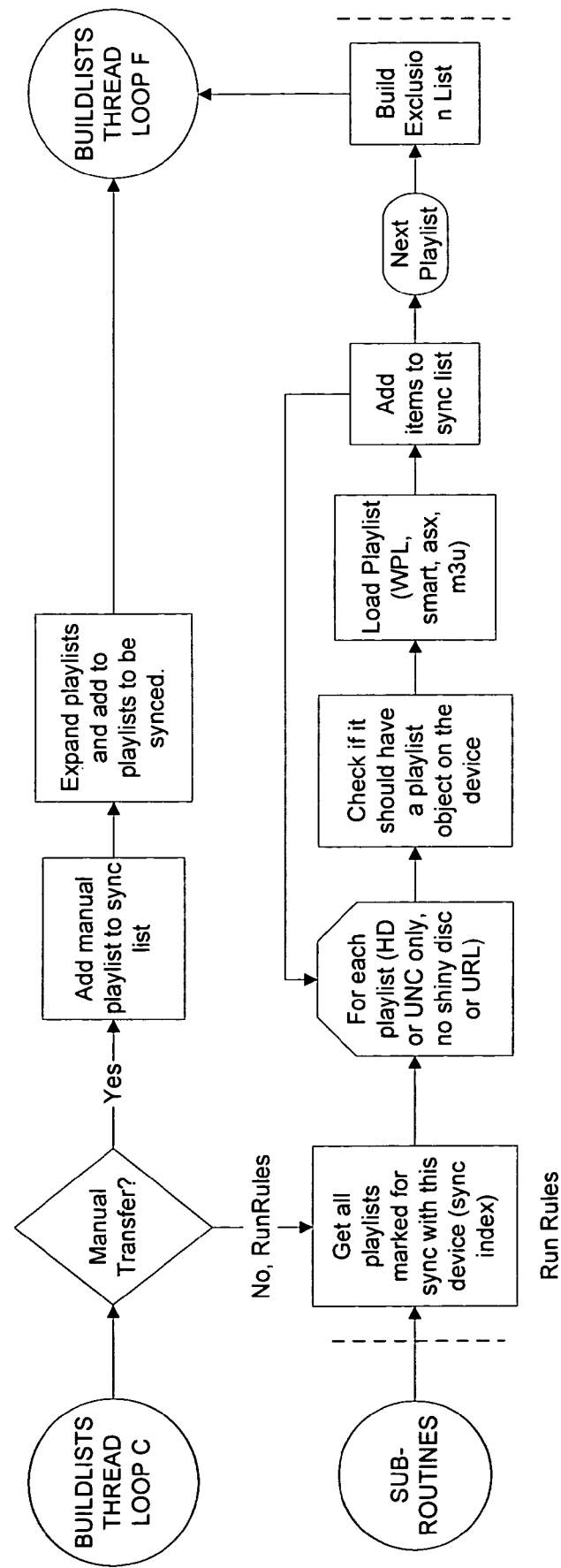
Figure 3E:
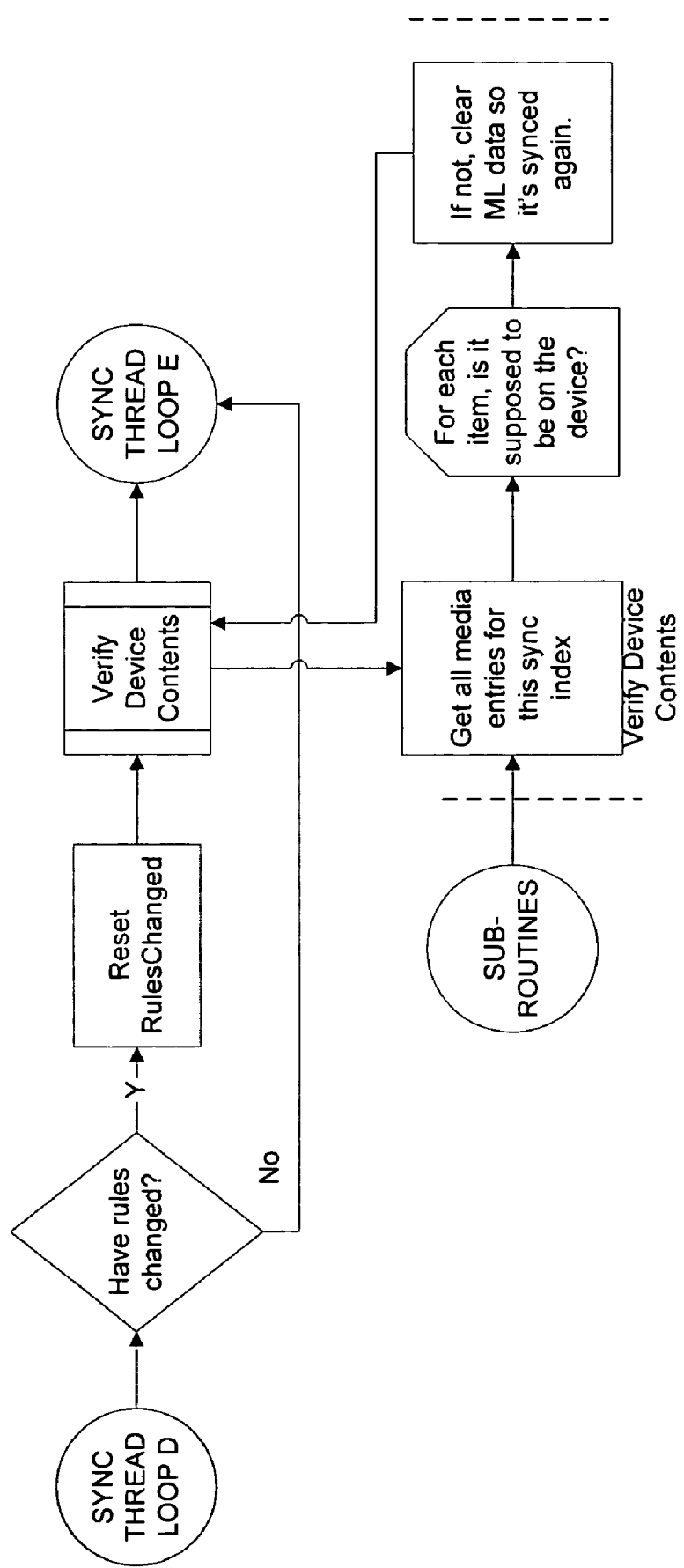

Referring now to FIG. 2, an exemplary flow diagram illustrates aspects of a synchronization algorithm according to the present invention. In one embodiment, computer 102 first examines device 116 at 202 and uses a quick heuristic (e.g., available free space) to detect whether or not the contents of device 116 have changed since the device was last seen by computer 102. If not, the record of what "should" be on device 116 in a local data store can be assumed to be correct, and determination of what files, if any, need to be transferred during this synchronization can go ahead without direct (and potentially time consuming) verification that each file that "should" be on the device is actually there. On the other hand, if the contents of device 116 have changed, computer 102 at 206 determines what the actual contents of device 116 are. It accomplishes this by loading a record of what "should" be on device 116 from a local data store. Computer 102, in this example, then examines each file that "should" be on device 116 to see if it is actually present at 208 (e.g., see FIG. 3E Verify Device Contents with respect to 202, 204, 206, and 208). If a particular media file should be stored on device 116 but it is not present, then computer 102 sets the local data store's notion of what device 116 should hold if the file had been on the device properly. In other words, a sync engine embodying aspects of the invention calculates what is "new" and therefore needs to be transferred without having to directly inspect the current contents of the device, since the locally stored record is assumed to be accurate. This saves considerable time compared to inspection of the actual device contents.

Figure 3F:
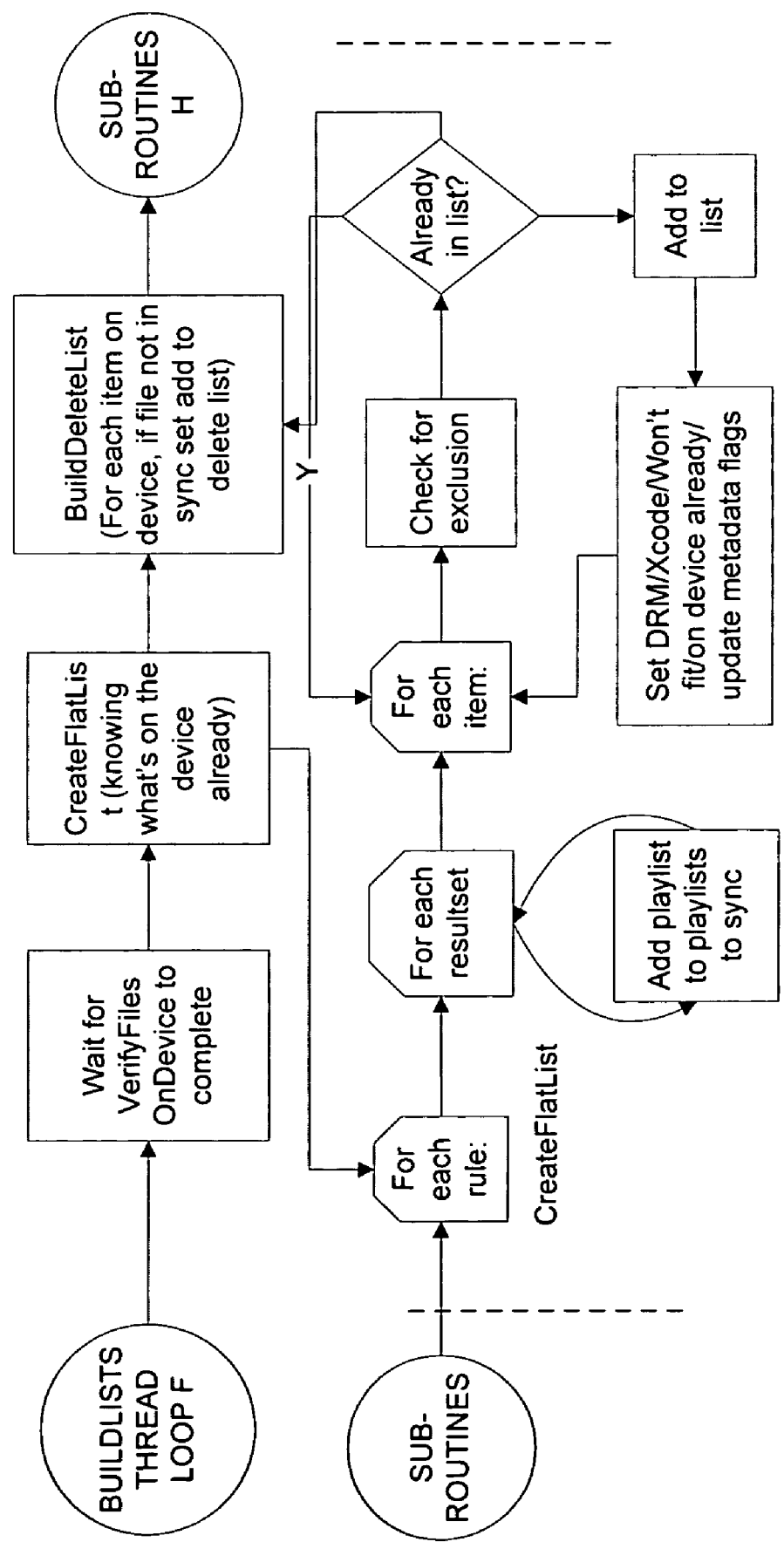

Proceeding to 210, computer 102 builds an ordered list of individual files that should be placed on device 116 (e.g., see FIG. 3F BuildLists Thread). Computer 102 builds the ordered list by loading each playlist in priority order and adding items from each playlist in order to the ordered list. When encountering duplicates, computer 102 discards the duplicates such that only the highest priority duplicate is placed in the list. Annotations may be added to this list as to whether or not the file "should" already be on device 116 (using the previously mentioned local data store property), whether or not the file needs to be transcoded to be sent to device 116, and whether or not the metadata associated with the file needs to be updated on device 116.

Figure 3G:
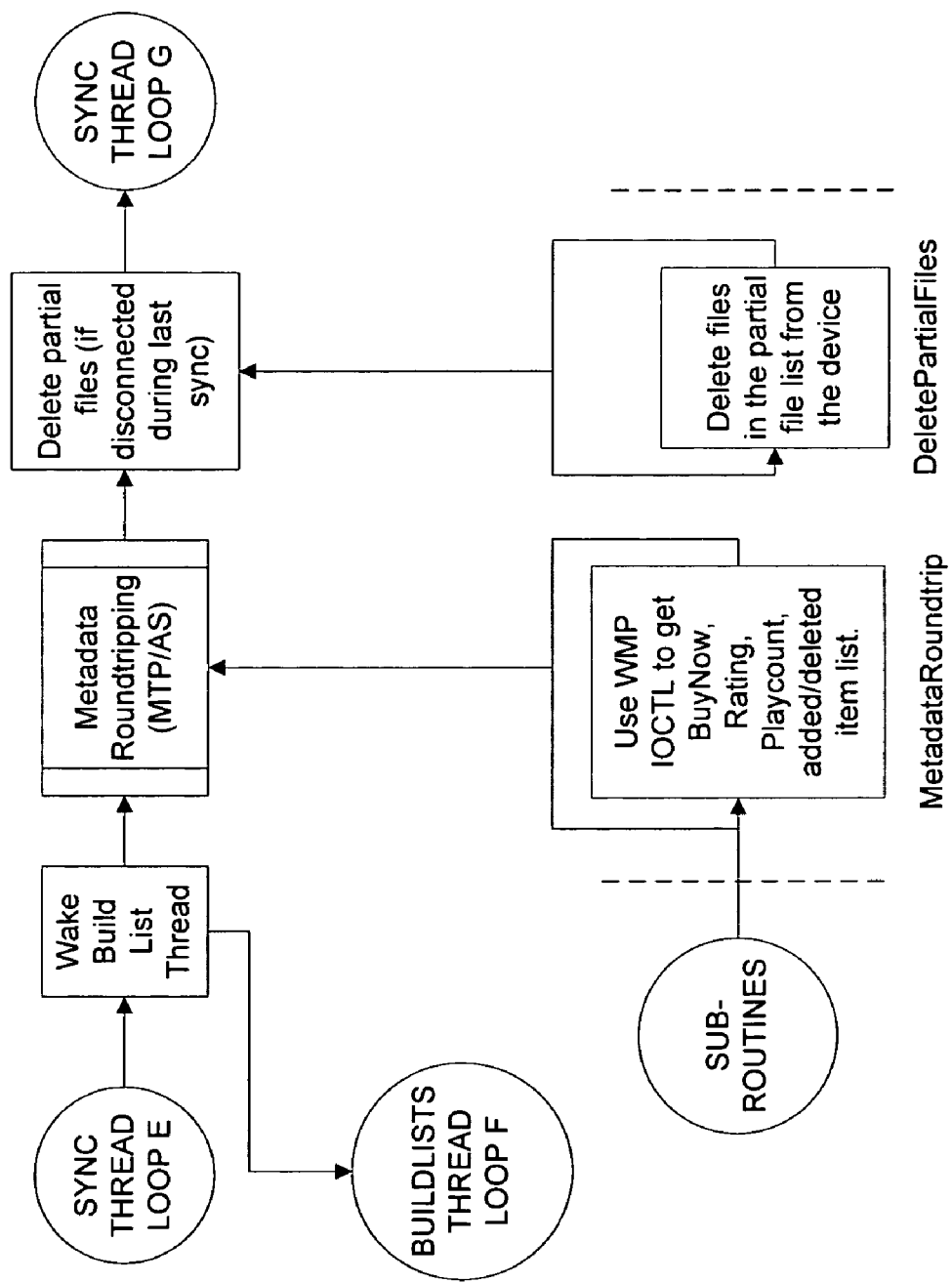
Figure 3H:
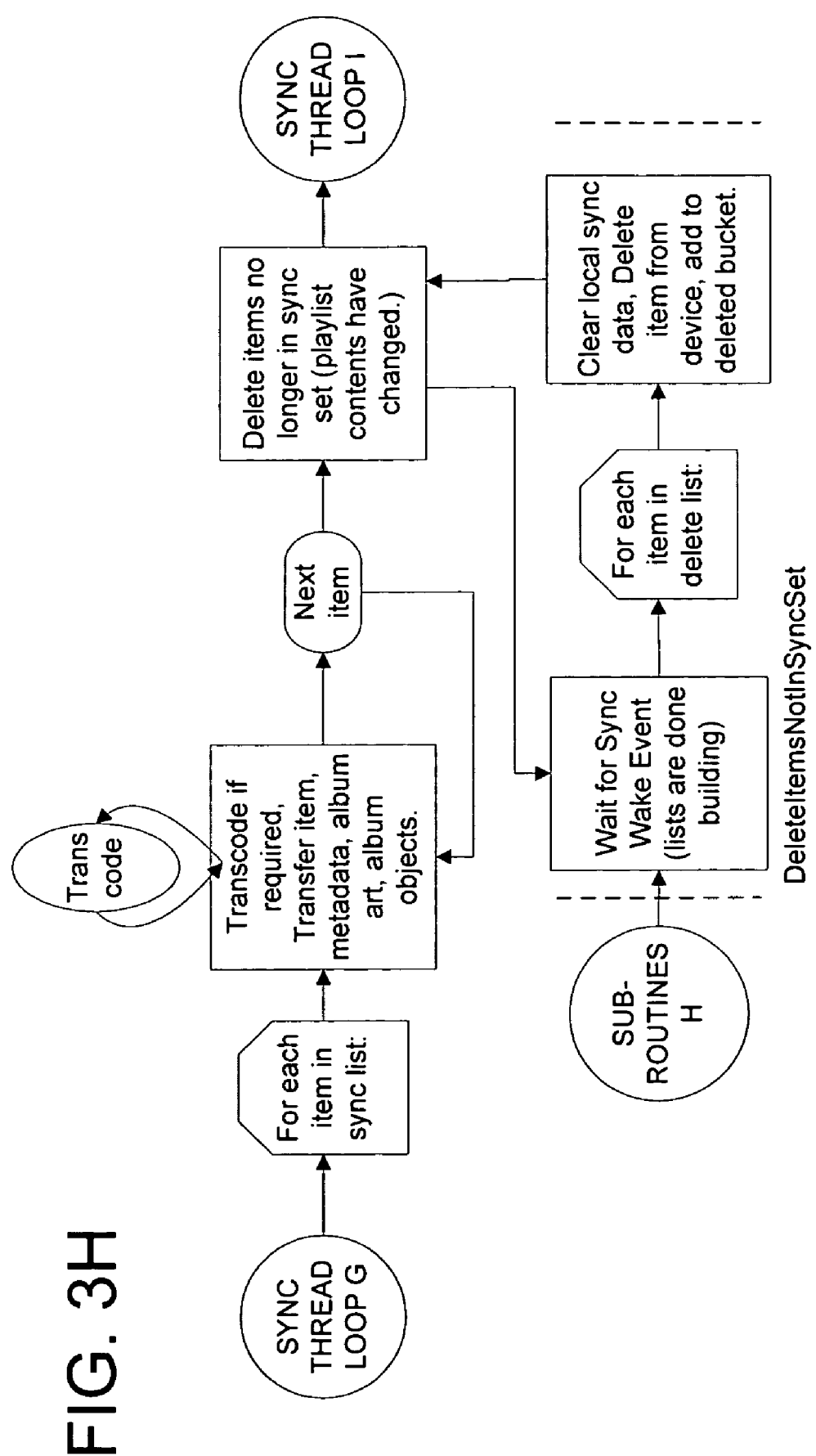
Figure 31:
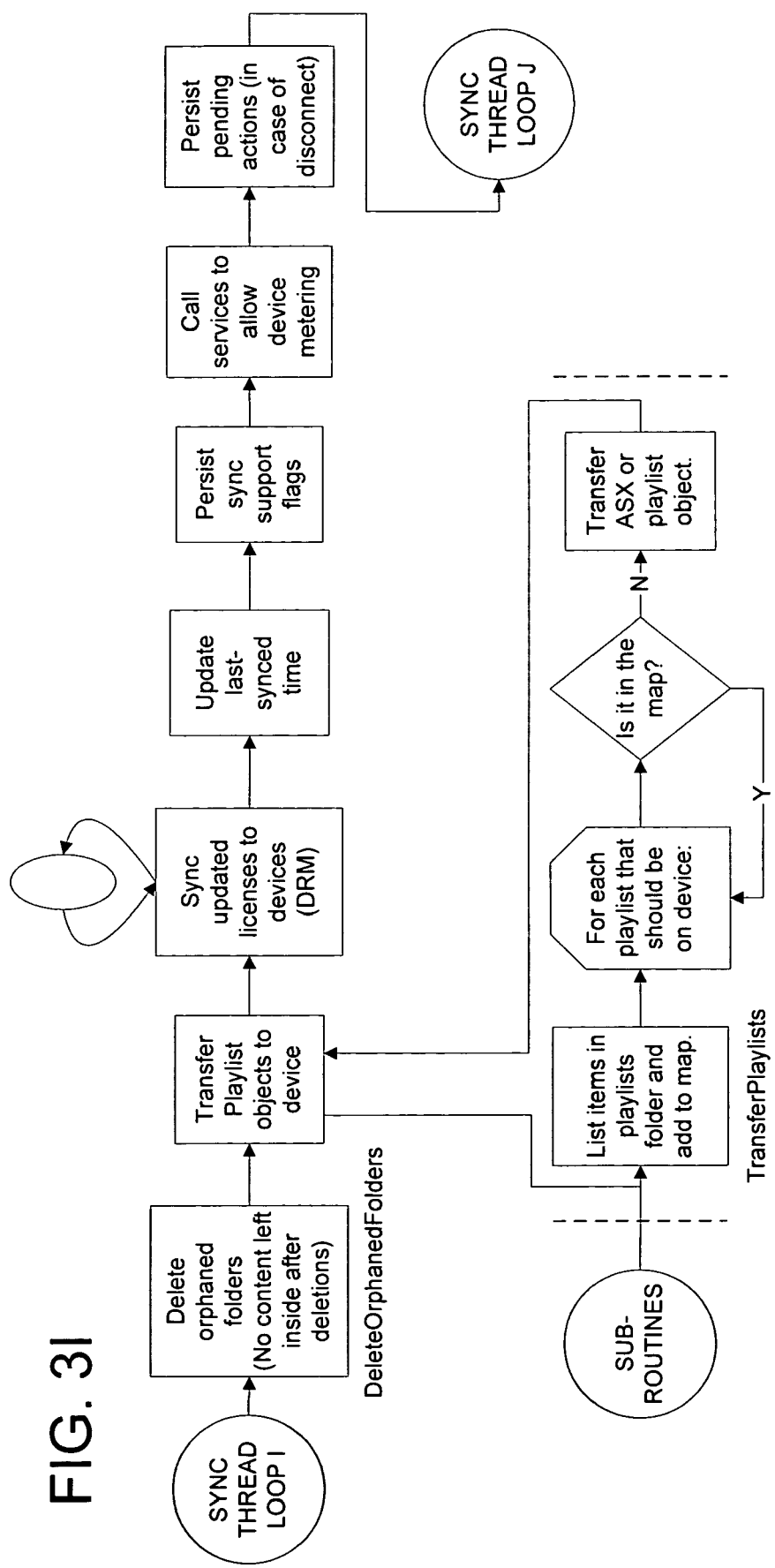
Figure 3J:
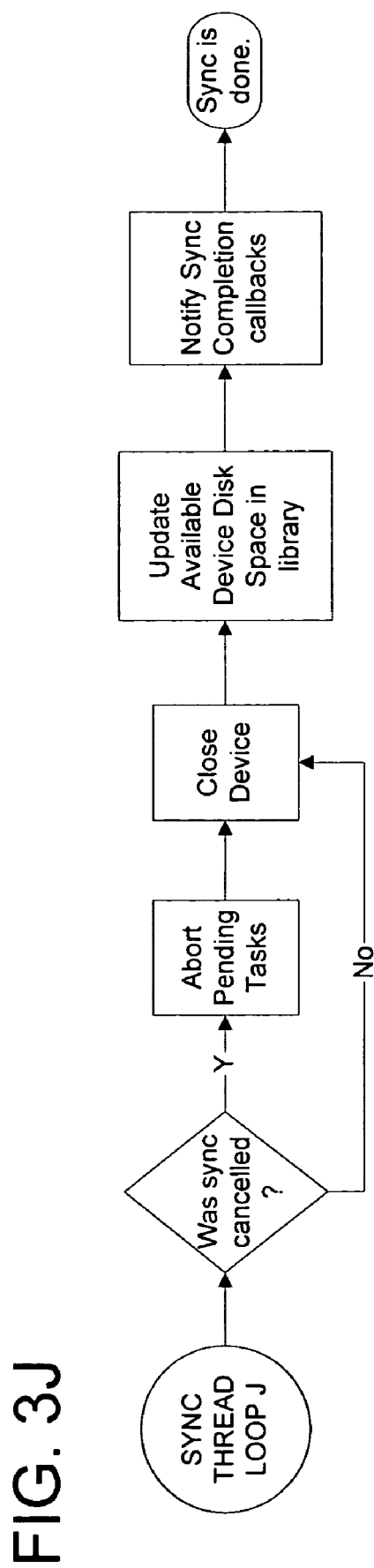

Simultaneously to building the ordered list, the sync engine of computer 102 begins other tasks. First, computer 102 performs a MetadataRoundTrip at 212 to merge any changes that happened to content on the device-side into the local database (e.g., see FIG. 3G Metadata Roundtripping). Computer 102 brings back current information such as one or more of the following: Rating, PlayCount, LastPlayTime, and AlbumArtClicks. It also retrieves lists of files that were added to, or deleted from, device 116 since the last synchronization. In addition, computer 102 performs any outstanding device cleanup operations at 214 (e.g., removal of a partially transferred file from device 116 that was not fully copied on the last sync, such as when the user disconnects (either intentionally or inadvertently) device 116 from computer 102 in the middle of a sync (e.g., see FIG. 3G Delete Partial Files). According to aspects of the invention, the ordered list being constructed in parallel is consumed. For example, in a parallel thread (process), the actual task of synchronizing new files (transcoding first, if necessary) from the ordered list under construction gets underway immediately, without waiting for completion of the list building process. This separation of threads is shown in the flow diagrams of FIGS. 3A-3J.

Proceeding to 216, computer 102 transfers the selected files to device 116. Files are taken from the ordered list at 210, transcoded if necessary, and then sent to device 116 (e.g., see FIG. 3H).

Referring to reference character 218 of FIG. 2, upon completion of the consumption of the ordered list constructed at 210, computer 102 deletes Items that are on device 116 but that are no longer in the current rules sending them to the device (this possibly could have been done already for a full device); deletes folders that may be orphaned by deleting the above items (there would no longer be any content in them, thus, they should be deleted); transfers the playlists/rules themselves to device 116 such that the user can pick playlists that match the criteria used to set up the sync for playback (e.g., the user could choose to play 5-star rated content through the playlist) (e.g., see FIG. 3I). In one embodiment, the sending of the playlists (which follows) is a separate action from the transfer of the content itself. As a side note, the playlists are also cleaned up and sent referring only to the contents of what was actually sent to device 116, which may be only a subset of what the user wanted to send to the device from that playlist. Thus, if the user has a playlist for which only part of it fits on device 116, only the part that fit would be in the playlist sent to the device. In addition, the sync engine of computer 102 also synchronizes digital rights management licenses and the like.

In another embodiment of the invention, computer 102 executes an algorithm to consume a generated file transfer list. In this embodiment, the sync engine executed by computer 102 waits until the first item in the list needing to be transferred becomes available (i.e., highest priority first). If the particular item is provided by a service, for example, the right to transfer the file may need to be verified with the service before transferring the file. Computer 102 queues the verification, which occurs in parallel with the transfer. When the verification completes, the item will be made available to the transfer list once again. If the particular item needs to be transcoded before transfer then computer 102 queues the transcode, which also happens in parallel with the transfer. When the transcode completes, the item will be made available to the transfer list once again. If there is not enough available disk space to transfer the item, deleted items that are on the device, but that are no longer in the current rules sending them to the device (this possibly could have been done already for a full device) may be deleted to free up space.

In consuming the generating file transfer list, computer 102 essentially "walks" the prioritized list of content from the bottom up and discards enough items that are below the priority of the item desired to be transferred until there is enough room on device 116 for the new piece of content. If there is still not enough available disk space to transfer the item, computer 102 ceases the transfer because device 116 is full in priority order.

In addition, computer 102 makes a folder on device 116 based on the file metadata (e.g., music/artist/album) and transfers the file into the appropriate folder. In one embodiment of the present invention, computer 102 updates the file's album object on device 116, which includes creating and maintaining a playlist-like structure that represents a single album. As part of doing this, basic heuristics may be used to populate common album metadata for the album (e.g., album art).

Advantageously, aspects of the invention provide the ability to deal with prioritization in rules and to use prioritization for properly maintaining a full device 116. Per-rule and per-file ordering in prioritization in accordance with aspects of the present invention overcome the problem of when device 116 becomes full and computer 102 has no notion of what content to delete. Take for example a simple video device: if designating the video device for children, the user may wish to simply keep as much content related to a particular children's program on the device as possible. If recording an episode of the program each day, the user will likely use up all of the available space on the video device very quickly (e.g., the user's rule is "Show=Barney"). Once the video device in the example becomes full, the user will want a mechanism for removing the "oldest" content from the device automatically. If the user sets a rule as sorted by date, then computer 102 could ensure that the newest episodes of program were always on the device whenever it is synchronized (i.e., older ones would be removed in favor of newer ones).

In one embodiment, the invention permits the provisional transfer of lower priority media files rather than waiting for a higher priority file to be transcoded for rendering on the portable client device 116. In this manner, the invention avoids undesirable transfer delays by parallel transcoding and device transfer. If device 116 happens to become full, the lower priority content would simply be removed.

A related prioritization aspect of the invention provides the ability to transfer items ahead of the prioritized queue while waiting on a more lengthy non-transfer operation (such as transcoding)—while still retaining proper prioritization. In this manner, secondary operations that do not make use of the "pipe" between device 116 and computer 102 are performed in parallel with other operations that are operating on device 116. There are several of these operations, notably Transcode, Silent License Acquisition, Service License Check, etc. For example, transcoding can be a very long CPU intensive process. Transferring content that does not need to be transcoded in parallel to a transcode operation greatly speeds up synchronization. A simple example of this would be sync rules that always transfer the latest episode of a television program and then all of the user's five-star music content. For most, if not all, conventional video-capable devices, the video media file will likely need to be transcoded before it can be played on the device. The audio files are much less likely to need transcoding. Because the present invention is a priority-ordered system, the TV show should be transferred to device 116 first and followed by as much five-star audio content as possible. Transcoding the TV show will likely take a considerable amount of time (e.g., 10-30 minutes). During this time, the present invention permits all of the five-star content that would fit on device 116 to be transferred. When the transcoding operation on the TV show has finished, computer 102 transfers the transcoded video file to device 116. It is to be understood that transferring the higher-priority video file may result in possibly replacing a lower-priority music files to make room for the TV show. Overall this is a better experience as it completes the job faster and presents device 116 with the best blend of content possible if the user disconnects the device from computer 102 in the middle of a transfer.

In an alternative embodiment of the present invention, space reservation is the concept of reserving some amount of free space on the device that should not be occupied by synchronized files. This enables the user to have the same experience outlined above with prioritization of content as appropriate, but allows the experience to be forced onto a smaller set of content, which reserves room on the device's storage mechanism for other potential uses. This feature of the invention is particularly helpful for a device that serves double-duty (e.g., as a music player and a camera).

In yet another embodiment, the invention may include an exclusion list. Just as the user might wish to have rules for which content gets synchronized to the device 116, it would be desirable to have rules for the content that will not get synchronized to device 116. For example, a user may wish to transfer all of his or her 5-star content to device 116 except for certain files (e.g., highly rated Christmas music). This may be accomplished by an exclusion rule for "Genre=Christmas."

As described above, aspects of the present invention also involve operation of the device 116 in an open system, and includes dealing with files moved or deleted on device 116 outside of the player sync; recognizing and "taking over" a file located on device 116 that matches a transfer file; and synchronizing to a metadata organized hierarchy.

In one embodiment, the present invention can deal with files that happen to have been moved on or deleted from device 116 outside of the player sync. This is less of a concern in a closed system where the user is in control of the device capabilities and can constrain a device to not be modified outside of the sync experience. In an open environment, however, where there is usually a large array of devices competing against each other on form factor, a feature set, deletion, and shell extensions (where the user can store other file types or manipulate the files stored on the device directly) are popular additions. When the user can modify the contents on device 116, several items may potentially by out of date at the next synchronization (e.g., files have been removed, new files have been added, etc.). Advantageously, the invention in one embodiment handles this by detecting when changes on device 116 have occurred and synchronizing those changes with the current state.

The ability to recognize and "take over" a file located on device 116 that matches a transfer file provides another aspect of the invention. Additional intelligence can detect references to a file that has been placed on device 116 through an alternative method (e.g., with a shell extension, with another computer, with a previous sync relationship that has been deleted, etc.). This feature of the invention allows computer 102 to "pick up" the reference and take over ownership of the particular file, rather than retransferring it and overwriting it or making a duplicate on device 116. For instance, when the sync engine is about to write a file into the exact same location (as described below, and there is a pre-existing file of exactly the same name and same size as the one about to be written, the sync engine may assume that the files are in fact the same, and take over the existing file rather than rewriting a duplicate copy. If the size does not match, however, the sync engine may assume that they are not actually the same, and rename the new copy prior to transferring it to device 116 in order to avoid naming collision.

In yet another embodiment, the invention synchronizes files to a metadata organized hierarchy. The sync algorithm discussed above automatically copies content to a directory hierarchy ordered by content type followed by relevant metadata fields for the content. For example, tracks from the Pearl Jam album Ten would be placed under the basic structure:

\Music\Pearl Jam\Ten\

This post-transfer layout is automatic based upon the file metadata and makes browsing devices with explorer shell extensions much easier.

As described above, aspects of the present invention also involve maintenance of the device transfer, and includes synchronizing on-device metadata edits with the media library; recognizing and sending individual metadata updates without re-sending the content; synthesizing and pushing album objects to device 116; recovering from a disconnected sync and avoiding leaving stale data on device 116 (e.g., partial transfers or directory names); and tracking and re-use of transcoded files.

In one embodiment, the invention synchronizes on-device metadata edits with the user's media library. Changes to some on-device metadata properties (such as rating, playcounts, etc.) may be synchronized from device 116 back to the player's media library. Care must be taken with these edits to ensure they are applied properly as content whose metadata has changed may be destined to be removed from the device as a result of the current sync.

Aspects of the invention also involve synthesizing and pushing album objects to device 116. It is highly desirable for a hierarchy shown on target device 116 to match the one shown on source computer 102. This tends to be difficult as metadata typically is not consistent or sufficient enough in order to properly disambiguate albums. For example, there are hundreds, possibly thousands of albums named "Greatest Hits". The MPA 104 has logic to properly separate these albums. By having MPA 104 send this information to device 116, the device can share this separation. Other advantages involve the ability of MPA 104 to synthesize information about an album and send that information as part of an album object a single time, rather than for every media item (examples here would be sending album art as part of the album object, rather than attached to each track, and synthesizing a genre for an album when individual tracks may each have different genres).

As an example, the album object defines album metadata for each track on an album such as album name, artist name, and premium metadata such as album art data. By creating the album object, subsequent transfers of album property data for other media files 106 associated with the same album are not required, and thus, the amount of time and storage space required to transfer a different media file 106 from that same album is reduced as compared to the amount of time required for the first media file 106. For example, after a first track from the album entitled "Paradise," by Kenny G, is transferred to the portable media device 116, an album object is created that includes, in part, the name of the album as specified by metadata included in the first track (i.e., media file 106) and album art data. Thereafter, when a second track is being transferred, the media player application 104 can query data included in album objects stored in the memory of the portable media device 116 to determine if the name of the album as specified by metadata included in the first track matches the name of the album specified by metadata included in the album object. If a match is detected, the media player application 104 will not transfer album art to the portable media device 116 because the corresponding album art can be retrieved from the album object having metadata specifying the matching album name. As a result, subsequent transfers of media files 106 from the same album occur faster, and premium metadata such as album art does not need to be retransmitted for each media file 106 from the same album. Thus, system 101 provides improved management of the transfer of media files 106 between a client computer 102 and portable media device 116 by permitting a user to simultaneously update and transfer premium metadata associated media files 106 while respecting the copyright restrictions with respect to such premium metadata.

Another maintenance feature of the present invention relates to recovering from a disconnected sync and avoiding stale data left on the device (e.g., partial transfers or directory names). Users commonly get impatient and prematurely remove device 116 from its dock station (or USB cable or the like) before synchronization has been completed. One additional level of intelligence that MPA 104 adds is to track when this happens in the middle of a transfer. In other words, computer 102 maintains awareness of the possible existence of a partial file on device 116. On the next sync, the sync engine of computer 102 seeks out this partial file (and potentially directory structure) and cleans it up.

In one embodiment, the invention recognizes and sends individual metadata updates without re-sending the content.

For example, metadata timestamps may be examined to know when a media file's attributes have been changed since the last time the file has been synchronized. This enables the metadata for a file to be re-synchronized as part of a sync without actually re-sending the file.

Another feature of the present invention permits tracking and re-use of transcoded files. This allows for re-use of transcodes that have previously been transferred if the transcode is needed again in the future, avoiding a fairly length operation during sync.

FIGS. 3A-3J illustrate the exemplary synchronization process of FIG. 2 in greater detail.

Figure 4:
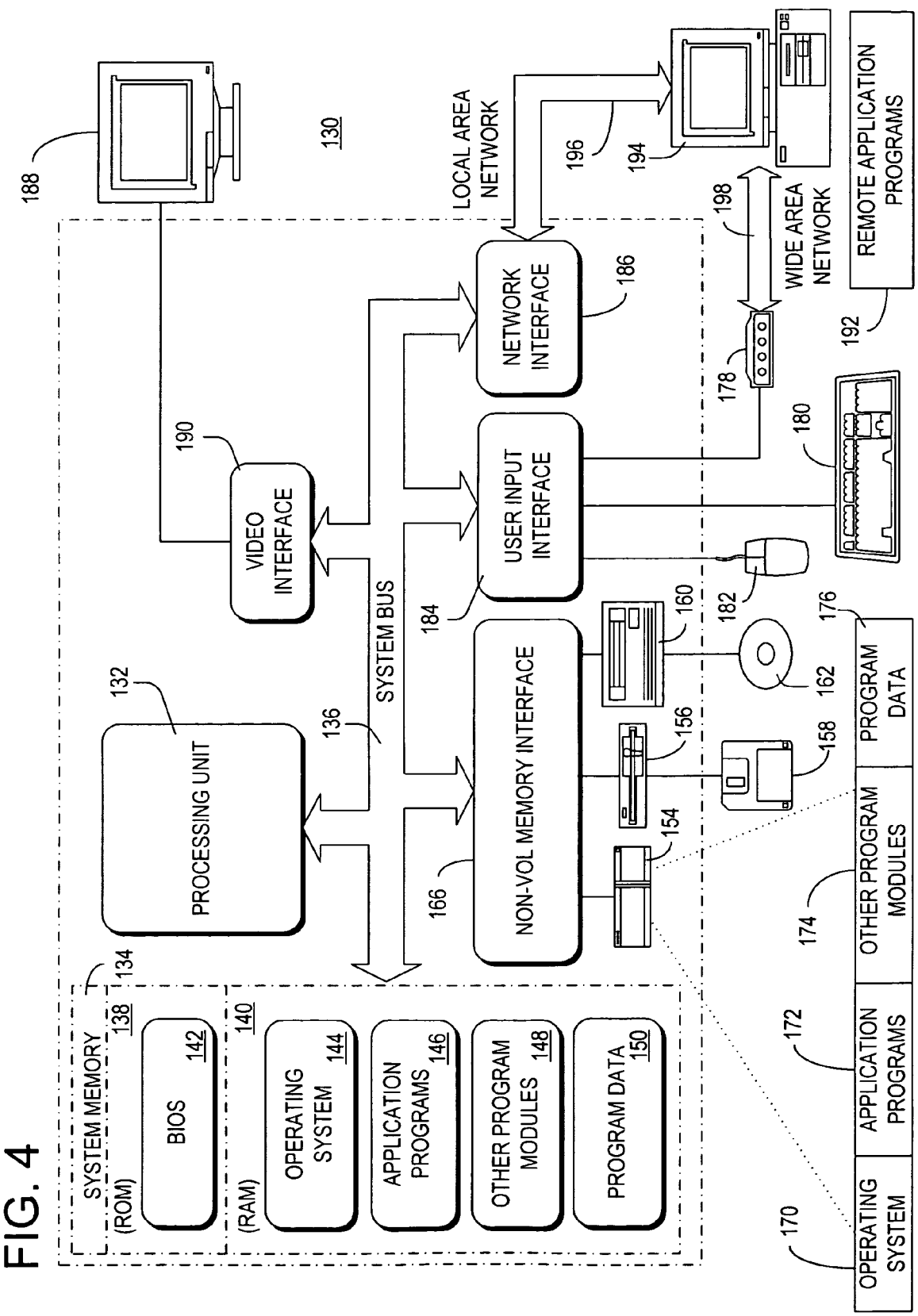
FIG. 4 is a block diagram illustrating an exemplary embodiment of a suitable computing system environment in which one embodiment of the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In FIG. 1, the source device is depicted as a desktop personal computer 102. However, in other implementations, the source device may be a portable laptop computer, another portable device, a mini-computer, a mainframe computer, a server, a storage system, a dedicated digital appliance, or another device having a storage sub-system configured to store a collection of digital data items. Furthermore, the implemented source device 102 is configured to copy all or some of its collection of digital data items to a coupled device.

In FIG. 1, the target device is depicted as a portable device 116, such as a media player. However, in other implementations, the target device may be a non-portable computer, a portable laptop computer, another portable device, a mini-computer, a mainframe computer, a server, a storage system, a dedicated digital appliance, or another device having a storage sub-system configured to store a collection of digital data items. Furthermore, the implemented target device 116 is configured to receive a copy of all or some of a coupled source device's collection of digital data items.

Herein, "digital items" of a digital collection is any type of independently addressable unit of digital data which is typically stored within a computer memory or storage system. Examples of such a "digital item" include (but are not limited to): music, image, video, text documents, hypertext document, documents of any format, applications, spreadsheets, graphics, playlists, and data. A digital item may include a collection of other items.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of synchronizing one or more digital files stored on a source device and a target device coupled thereto, said method comprising:
   receiving a plurality of rules for selecting which of the digital files are to be transferred from the source device to the target device, said plurality of rules assigning priorities to each of the digital files;
   building a designated list of the digital files to be transferred, each of the digital files on said designated list being ordered according to the priorities defined by the plurality of rules;
   identifying duplicate digital files on the designated list and removing, from the designated list, each of the duplicate digital files that has a lower priority than its duplicate digital file;
   transferring a first at least one of the digital files on the designated list from the source device to the target device, said first digital files having a lower priority and a faster transfer time than a second at least one of the digital files remaining on the designated list having a higher priority and a slower transfer time, said second at least one of the digital files having at least one non-transfer operation performed thereon by the source device; and
   after transferring the first at least one of the digital files and after performing the non-transfer operation, transferring the second at least one of the digital files from the source device to the target device as a function of a defined storage capacity of the target device, said first at least one of the digital files being replaced on the target device by the second at least one of the digital files in order from lowest priority to highest priority, as a function of the defined storage capacity of the target device and as a function of said second at least one of the digital files having a higher priority than the transferred first at least one of the digital files.

2. The method of claim 1, wherein storage requirements of the designated list of digital files to be transferred is greater than the defined storage capacity of the target device.

3. The method of claim 1, further comprising directing the target device to remove a digital file stored thereon but not part of the designated list of digital files to be transferred.

4. The method of claim 1, wherein the one or more digital files are selected from a group of digital content consisting of audio, image, video, and text.

5. The method of claim 1, wherein the one or more digital files include media content and wherein receiving the plurality of rules comprises receiving a user-defined playlist associated with a desired rendering of the media content of one or more of the one or more digital files.

6. The method of claim 1, further comprising examining the target device to detect whether the one or more digital files stored on the target device have changed since the target device was last synchronized with the source device.

7. The method of claim 6, further comprising building a content list of the one or more digital files previously transferred to the target device, comparing the content list of digital files previously transferred to the designated list of digital files to be transferred, and transferring only the one or more digital files on the designated list but not on the content list.

8. The method of claim 1, wherein one or more tangible computer-readable storage media have computer-executable instructions for performing the method recited in claim 1.

9. A method of synchronizing one or more digital files stored on a source device and a target device coupled thereto, said method comprising:
   receiving a plurality of rules for selecting which of the one or more digital files are to be transferred from the source device to the target device, said plurality of rules assigning priorities to the one or more digital files;
   building a designated list of the one or more digital files to be transferred, each of the one or more digital files on said designated list being ordered according to the priorities defined by the plurality of rules;
   identifying duplicate digital files on the designated list and removing, from the designated list, each of the duplicate digital files that has a lower priority than its duplicate digital file;
   examining the target device to detect whether the one or more digital files stored on the target device have changed since the target device was last synchronized with the source device;
   building a content list of the one or more digital files previously transferred to the target device;
   comparing the content list of digital files previously transferred to the designated list of digital files to be transferred;
   transferring, from the source device to the target device, only the one or more digital files on the designated list but not on the content list as a function of a defined storage capacity of the target device, wherein said transferring includes transferring a first at least one of the digital files having a lower priority and a faster transfer time than a second at least one of the digital files remaining on the designated list having a higher priority and a slower transfer time, said second at least one of the digital files having at least one non-transfer operation performed thereon by the source device, and subsequently transferring the remaining second at least one of the digital files while performing the non-transfer operation thereon in parallel, said first at least one of the digital files being replaced on the target device by the second at least one of the digital files after performing the non-transfer operation in order from lowest priority to highest priority, as a function of the defined storage capacity of the target device and as a function of said second digital files having a higher priority than the transferred first digital files.

10. The method of claim 9, further comprising directing the target device to remove a digital file stored thereon but not part of the designated list of digital files to be transferred.

11. The method of claim 9, wherein the one or more digital files are selected from a group of digital content consisting of audio, image, video, and text.

12. The method of claim 9, wherein the one or more digital files include media content and wherein receiving the plurality of rules comprises receiving a user-defined playlist associated with a desired rendering of the media content of one or more of the one or more digital files.

13. The method of claim 9, wherein one or more tangible computer-readable storage media have computer-executable instructions for performing the method recited in claim 9.

14. A media player system for synchronizing digital media files comprising:
   a source database storing a plurality of digital media files; and
   a computer associated with the source database, said computer comprising a synchronization engine for managing transfer of media files from the source database to a portable device coupled to the computer as a function of a defined storage capacity of the portable device, said synchronization engine being configured to receive one or more user-defined playlists for selecting which of the media files are to be transferred to the portable device, said playlists being associated with a desired rendering of media content of one or more of the media files and assigning priorities to the one or more digital files, said synchronization engine being farther configured to build a designated list of the one or more digital files to be transferred, each of the one or more digital files in said designated list being ordered according to the priorities defined by the playlists, said designated list omitting duplicate digital files that have lower priorities than their duplicate digital files, said synchronization engine being configured to transfer, from the source database to the portable device, a first one or more of the digital files on the designated list before a second one or more of the digital files on the designated list, said second one or more of the digital files being transcoded during the transfer of the first one or more of the digital files, wherein the first one or more of the digital files has a lower priority and a faster transfer time than the second one or more of the digital files, and wherein said second one or more of the digital files is transferred after the transfer of the first one or more digital files is completed and replaces the transferred first one or more of the digital files on the portable device, with the first one or more of the digital files being replaced in order from lowest priority to highest priority, as a function of a defined storage capacity of said portable device and as a function of said second one or more of the digital files having a higher priority than the first one or more the digital files.

15. The system of claim 14, wherein the synchronization engine is further configured to examine the portable device to detect whether the media files stored thereon have changed since the portable device was last synchronized with the computer and to build a content list of the media files previously transferred to the portable device for comparison with the designated list of media files to be transferred, said computer transferring to the portable device only the media files on the designated list but not on the content list.

\* \* \* \* \*

UNITED STATES PATENT AND TRADEMARK OFFICE
CERTIFICATE OF CORRECTION

PATENT NO. : 7,647,346 B2  Page 1 of 1
APPLICATION NO. : 11/092354
DATED : January 12, 2010
INVENTOR(S) : Silverman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Twenty-eighth Day of December, 2010

David J. Kappos
*Director of the United States Patent and Trademark Office*